US012627412B2

(12) United States Patent
Vemuri et al.

(10) Patent No.: US 12,627,412 B2
(45) Date of Patent: May 12, 2026

(54) OPTIMIZATION OF VEHICLE COMMUNICATIONS EMPLOYING RETRANSMISSION REQUEST PROTOCOL

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Andrew J MacDonald, Grosse Pointe Park, MI (US); Scott T. Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 642 days.

(21) Appl. No.: 18/079,223

(22) Filed: Dec. 12, 2022

(65) Prior Publication Data

US 2024/0195533 A1 Jun. 13, 2024

(51) Int. Cl.
| | |
|---|---|
| *H04L 1/1812* | (2023.01) |
| *H04L 1/1607* | (2023.01) |
| *H04L 1/1825* | (2023.01) |
| *H04L 1/1829* | (2023.01) |
| *H04L 1/1867* | (2023.01) |
| *H04W 72/512* | (2023.01) |

(Continued)

(52) U.S. Cl.
CPC .......... *H04L 1/1812* (2013.01); *H04L 1/1607* (2013.01); *H04L 1/1825* (2013.01); *H04L 1/1854* (2013.01); *H04L 1/1887* (2013.01);

*H04L 1/1893* (2013.01); *H04W 72/512* (2023.01); *H04L 2001/0092* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2015/0039958 A1* | 2/2015 | Vos ........................ | H04L 1/1825 714/748 |
| 2017/0237673 A1* | 8/2017 | Law ...................... | H04W 4/023 370/338 |
| 2018/0091634 A1* | 3/2018 | Mobasher .............. | H04N 19/66 |

(Continued)

*Primary Examiner* — Pao Sinkantarakorn
*Assistant Examiner* — Rya Teon Nelson
(74) *Attorney, Agent, or Firm* — Quinn IP Law

(57) ABSTRACT

A system of managing communications in a vehicle includes a telematics unit connected to the vehicle. The telematics unit is configured to execute a retransmission request protocol upon receipt of erroneous data. A command unit in communication with the telematics unit, the command unit having a processor and tangible, non-transitory memory on which instructions are recorded. The command unit is adapted to determine vehicle situational parameters at a beginning of a data communication cycle. The vehicle situational parameters including current location and navigation status of the vehicle. When a first retransmission according to the retransmission request protocol is detected, the vehicle situational parameters are updated. The command unit is adapted to determine a desirable value of a retransmission frequency for the retransmission request protocol based in part on the updated vehicle situational parameters. In one embodiment, the retransmission request protocol is Hybrid Automatic Repeat Request (HARQ).

11 Claims, 6 Drawing Sheets

(51) Int. Cl.
 *H04L 1/00*    (2006.01)
 *H04W 72/0446*  (2023.01)

(56)     References Cited

U.S. PATENT DOCUMENTS

| | | | |
|---|---|---|---|
| 2019/0208506 A1* | 7/2019 | Baldemair | H04W 72/23 |
| 2019/0289478 A1* | 9/2019 | Hosseini | H04L 5/003 |
| 2019/0305894 A1* | 10/2019 | Hosseini | H04W 76/27 |
| 2019/0306923 A1* | 10/2019 | Xiong | H04L 27/261 |
| 2021/0126753 A1* | 4/2021 | Mochizuki | H04L 5/0037 |
| 2021/0168836 A1* | 6/2021 | Takeda | H04W 72/1263 |
| 2021/0225093 A1* | 7/2021 | Hergesheimer | G07C 5/008 |
| 2021/0227535 A1* | 7/2021 | Li | H04W 72/51 |
| 2022/0271874 A1* | 8/2022 | Behravan | H04L 5/0064 |
| 2022/0417954 A1* | 12/2022 | Hong | H04W 72/23 |
| 2023/0379832 A1* | 11/2023 | Mura | H04W 52/367 |
| 2024/0356677 A1* | 10/2024 | Zhang | H04W 72/0446 |
| 2025/0151012 A1* | 5/2025 | Rao | G01S 5/0268 |
| 2025/0166502 A1* | 5/2025 | Gaillet | G08G 1/0116 |

* cited by examiner

OPTIMIZATION OF VEHICLE COMMUNICATIONS EMPLOYING RETRANSMISSION REQUEST PROTOCOL

INTRODUCTION

The present disclosure relates generally to a system and method for managing communications in a vehicle employing a retransmission request protocol. The ever-increasing complexity of devices has led to an increase in wireless communication between various entities. For example, a vehicle may utilize cellular communications while driving along a road surface. Various protocols have been developed to efficiently implement such communications. One such protocol is the Hybrid Automatic Repeat Request (HARQ), whereby a retransmission request is automatically submitted to a sender by a receiver when erroneous data is received. The retransmission request may be repeated numerous times. When a vehicle is in motion, there may be circumstances which result in a wastage of slots for HARQ retransmissions that are not required by the vehicle.

SUMMARY

Disclosed herein is a system for managing communications in a vehicle. The system includes a telematics unit connected to the vehicle. The telematics unit is configured to execute a retransmission request protocol upon receipt of erroneous data. A command unit is in communication with the telematics unit, the command unit having a processor and tangible, non-transitory memory on which instructions are recorded. The command unit is adapted to determine vehicle situational parameters at a beginning of a data communication cycle. The vehicle situational parameters include current location and navigation status of the vehicle. The navigation status may include the past trajectory, the predicted or planned trajectory of the vehicle and speed.

When a first retransmission according to the retransmission request protocol is detected, the vehicle situational parameters are updated. The command unit is adapted to determine a desirable value of a retransmission frequency for the retransmission request protocol based in part on the updated vehicle situational parameters. In one embodiment, the retransmission request protocol is Hybrid Automatic Repeat Request (HARQ).

The command unit may be adapted to determine the desirable value for a response time based in part on the vehicle situational parameters, the response time being between receipt of the erroneous data and a response by the telematics unit. The vehicle situational parameters may include respective locations and respective signal strengths of one or more cellular towers within a predefined radius of the vehicle.

In one embodiment, the command unit may be adapted to determine if an average data transfer rate required by a group of vehicles is above a predefined high threshold, the group having substantially similar downlink needs, where the vehicle is part of the group. The command unit may be adapted to designate a lead vehicle in the group to estimate lost code-block-groups (CBGs) for the group when the average data transfer rate for the group is above the predefined high threshold. The command unit may be adapted to employ preemptive estimates for the retransmission frequency for the lost code-block-groups (CBGs) when the average data transfer rate for the group is below the predefined high threshold.

In another embodiment, the command unit may be adapted to determine if an average bit error rate for a group is greater than a predefined error rate threshold, where the vehicle is part of the group, the group having requirements for Enhanced Mobile Broadband applications and Ultra-Reliable Low Latency Communication (URLLC) applications. The command unit may be adapted to estimate the requirements for the Enhanced Mobile Broadband applications and the Ultra-Reliable Low Latency Communication (URLLC) applications for the group when the average bit error rate is greater than the predefined error rate threshold.

The command unit may be adapted to reserve respective slots for the URLLC applications based on previous values of the retransmission frequency and a response time for the group. The command unit may be adapted to maximize switching of the respective slots from the Enhanced Mobile Broadband applications to the URLLC applications when the average bit error rate is less than or equal to the predefined error rate threshold.

In another embodiment, the command unit may be adapted to select an uplink session for execution of a transmission time interval (TTI) bundling protocol defined by a TTI number, the TTI bundling protocol being adapted to permit data transfer in multiple consecutive sub-frames with a single acknowledgement signal for an entire bundle. The command unit may be adapted to determine if the uplink session is a low-latency application having a latency below a predefined latency threshold. The command unit may be adapted to select the TTI number to be relatively small when the latency is below the predefined latency threshold and select the TTI number to be relatively large when the latency is at or above the predefined latency threshold.

Disclosed herein is a method of managing communications in a vehicle. The method includes installing a telematics unit in the vehicle and configuring the telematics unit to execute a retransmission request protocol upon receipt of erroneous data. The method includes communicating with a command unit via the telematics unit, the command unit having a processor and tangible, non-transitory memory on which instructions are recorded.

The method includes determining vehicle situational parameters at a beginning of a data communication cycle, via the command unit, the vehicle situational parameters including current location and navigation status of the vehicle. The method includes determining updated values of the vehicle situational parameters when a first retransmission according to the retransmission request protocol is detected, via the command unit. The method includes determining a desirable value of a retransmission frequency for the retransmission request protocol based in part on the updated values, via the command unit.

The above features and advantages and other features and advantages of the present disclosure are readily apparent from the following detailed description of the best modes for carrying out the disclosure when taken in connection with the accompanying drawings.

Figure 1:
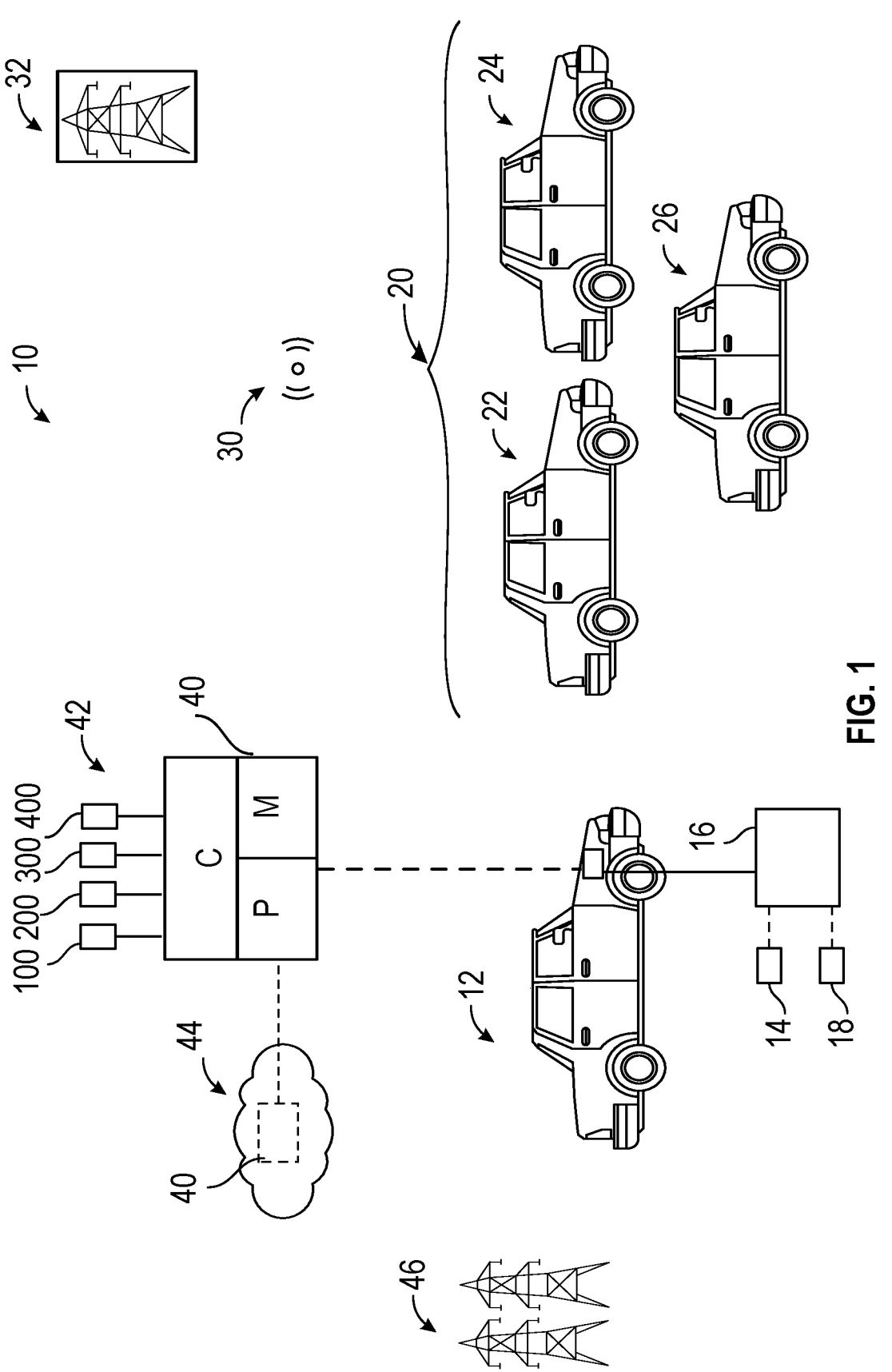
FIG. 1 is a schematic fragmentary diagram of a system for managing communication to and from a vehicle, the system having a command unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing communications in a vehicle 12 having a telematics unit 14. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Referring to FIG. 1, the vehicle 12 includes a communications device, referred to herein as a telematics unit 14, that is capable of carrying out wireless data communications. The telematics unit 14 is accessible to a vehicle controller 16. The telematics unit 14 may collect data pertaining to the vehicle 12, such as location, speed, engine data, maintenance requirements and servicing, by interfacing with various internal sub-systems. The telematics unit 14 may enable vehicle-to-vehicle (V2V) communication and/or a vehicle-to-everything (V2X) communication. In some embodiments, the vehicle 12 may communicate through a mobile device 18.

Referring to FIG. 1, the vehicle 12 may be part of a group 20 having additional vehicles 22, 24 and 26. The group 20 may be a fleet having a master or lead vehicle. The group 20 may be a platoon having a designated lead vehicle and one or more following vehicles traveling closely together while maintaining a specific distance.

The vehicle 12 may utilize cellular communications while driving along with the aid of at least one wireless network 30. The telematics unit 14 is operable to transmit and receive data through a communications link to a cellular tower. Each vehicle in the group 20 includes a respective network-accessing device to access the wireless network 30. The vehicle 12 may seamlessly switch use of various cellular towers along its route based upon their relative positions as the vehicle 12 travels through an area.

Figure 2:
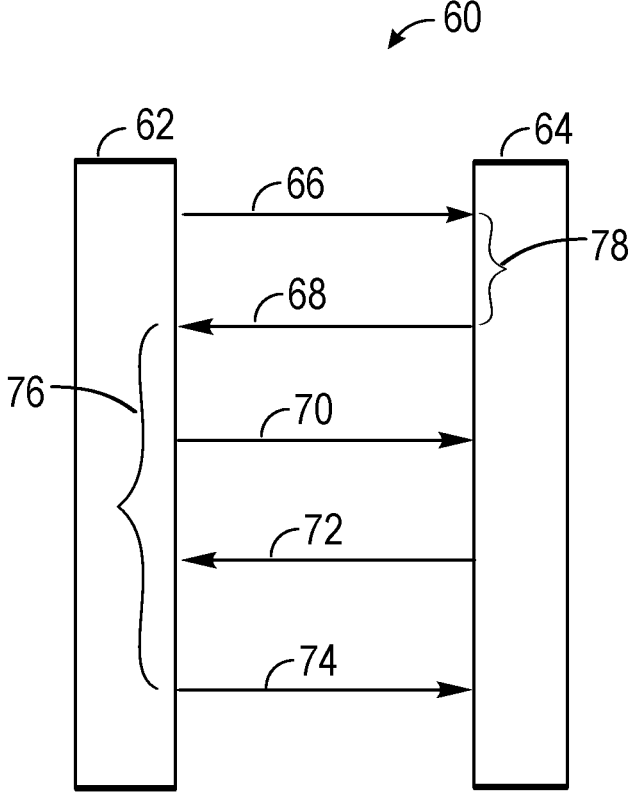
FIG. 2 is a schematic diagram of an example retransmission request protocol implementable by the system of FIG. 1.

The vehicle 12 may communicate with various entities, such as a base station 32 shown in FIG. 1, in accordance with a retransmission request protocol. In one embodiment, the base station 32 is a cell tower using new radio (NR) technology. FIG. 2 is a schematic diagram of an example retransmission request protocol 60 implementable by the system 10. In the embodiment shown, the retransmission request protocol 60 is Hybrid Automatic Repeat Request (HARQ). HARQ is a combination of an Automatic Repeat Request (ARQ) mode along with an error correction technique whereby data packets that are not properly decoded are no longer discarded. It is to be understood that the term "HARQ" includes variations and updates of HARQ.

As indicated by line 66 in FIG. 2, a sender 62 (e.g., base station 32) transmits an information unit at a time to a receiver 64 (e.g., telematics unit 14 of the vehicle 12). The information unit may be a packet, data frame, transmission burst etc. After sending the information unit, the sender 62 waits for a reply from the receiver 64. The newly received data may be combined with the previous erroneous data. The signaling employed with the HARQ protocol is the acknowledgement (ACK) and NACK (negative acknowledgement) indication.

In the retransmission request protocol 60, a retransmission request is submitted to the sender 62 upon receipt of erroneous data. Referring to FIG. 2, the receiver 64 sends a NACK signal (indicated by line 68) to the sender 62 and asks for a retransmission. As indicated by line 70, the sender 62 retransmits the information unit to the receiver 64 (as a first retransmission). Again, the receiver 64 sends a negative acknowledgment (NACK) to the sender 62 (as indicated by line 72) and asks for a retransmission. The sender 62 retransmits the information as indicated by line 74. The retransmission is stopped when a maximum number of retransmissions is reached, or an acknowledgment (ACK) signal is received by the sender 62. FIG. 2 shows the retransmission frequency 76 and a flexible time 78 between receipt of the erroneous data at the receiver 64 and a response by the receiver 64, referred to herein as response time 78.

Examples of HARQ techniques include incremental redundancy and chase combining. Incremental redundancy enables higher data rates by combining information from different transmissions of radio link control data blocks in the decoding process. Chase combining further improve the reliability of a retransmission stored in a HARQ buffer by combining one or more previous transmissions decoded in error. With chase combining, the retransmissions sent include the same information and use the original coding scheme. The sender 62 and the receiver 64 (e.g., vehicle 12) have respective HARQ buffers that need to be periodically flushed.

The frequency of HARQ retransmissions for failed packets may be relatively higher in certain situations, for example, due to asynchronous operation in 5G. Network coverage may be provided by a series of cellular towers, with each cell tower providing an area of coverage defined by a cell edge. When the vehicle 12 is in motion, the probability of the vehicle 12 staying within one cell edge or the confines of coverage provided by a single tower for a significant period of time may be minimal. This results in wastage of slots for HARQ retransmissions that are not required by the vehicle 12.

The system 10 employs a feedback mechanism for optimizing the request repeating data protocol 60. Specifically, the system 10 readjusts the HARQ mechanism so as not to waste retransmissions by selecting the retransmission frequency 76 and the response time 78 based on the situation/circumstances of the vehicle. Additionally as described below, with the knowledge of recent vehicle experience data points, the telematics unit 14 may help the base station 32 optimize various factors. The response time 78 is between transmitted data (e.g., sent via a physical downlink shared channel (PDSCH)) and the reply (ACK/NACK) from the receiver 64.

Referring to FIG. 1, the system 10 includes a command unit 40 having an integrated controller C with at least one processor P and at least one memory M (or non-transitory, tangible computer readable medium) on which instructions may be recorded for selectively executing one or more modules 42 for managing the connections of the vehicle 12. The modules 42 include an Assessment Module 100, a First Group Module 200, a Second Group Module 300 and transmission time interval (TTI) Bundling Module 400, which are described in detail below with respect to FIGS. 3-6, respectively.

The Assessment Module 100 pertains to a HARQ determination for a downlink session based on situational parameters of the vehicle 12. After a first retransmission is detected, Module 100 estimates the position, time and trajectory of the vehicle 12 and determines desirable values of the retransmission frequency 76 (number of HARQ retransmissions over time) and/or response time 78 between the data and acknowledgement (ACK/NACK) message based on the situation of the vehicle 12.

The First Group Module 200 enables HARQ feedback for a group 20 of vehicles having identical or substantially similar downlink data needs, based on predefined criteria. For example, the group 20 may be a platoon that receives similar commands from a central authority. The Second Group Module 300 enables HARQ feedback for a group 20 with vehicles having both high data transfer needs (e.g., requirement for Enhanced Mobile Broadband) and low latency needs (e.g., requirement for Ultra-Reliable Low Latency Communication applications). The transmission time interval (TTI) Bundling Module 400 applies to an uplink session with TTI Bundling, where a user equipment (UE) may transmit data in a physical uplink shared channel (PUSCH) with different redundancy versions in multiple consecutive sub-frames.

Each of the modules 42 may be embodied as computer-readable code or instructions stored on and partially executable by the command unit 40 of FIG. 1. It is understood that the modules 42 are independent of one another. The modules 42 may be consecutively or concurrently executed by the command unit 40. The memory M may store controller-executable instruction sets, and the processor P may execute the controller-executable instruction sets stored in the memory M.

The command unit 40 may be hosted or based out of a remotely located cloud computing service 44, shown in FIG. 1. The cloud computing service 44 may include one or more remote servers hosted on the Internet to store, manage, and process data. The cloud computing service 44 may be at least partially managed by personnel at various locations. Alternatively, the command unit 40 may be embedded in the vehicle controller 16. Where the vehicle 12 is part of a fleet, the command unit 40 may be embedded in a master or lead vehicle.

The wireless network 30 of FIG. 1 may be a short-range network or a long-range network. The wireless network 30 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or carrier systems available to those skilled in the art may be employed.

Figure 3:
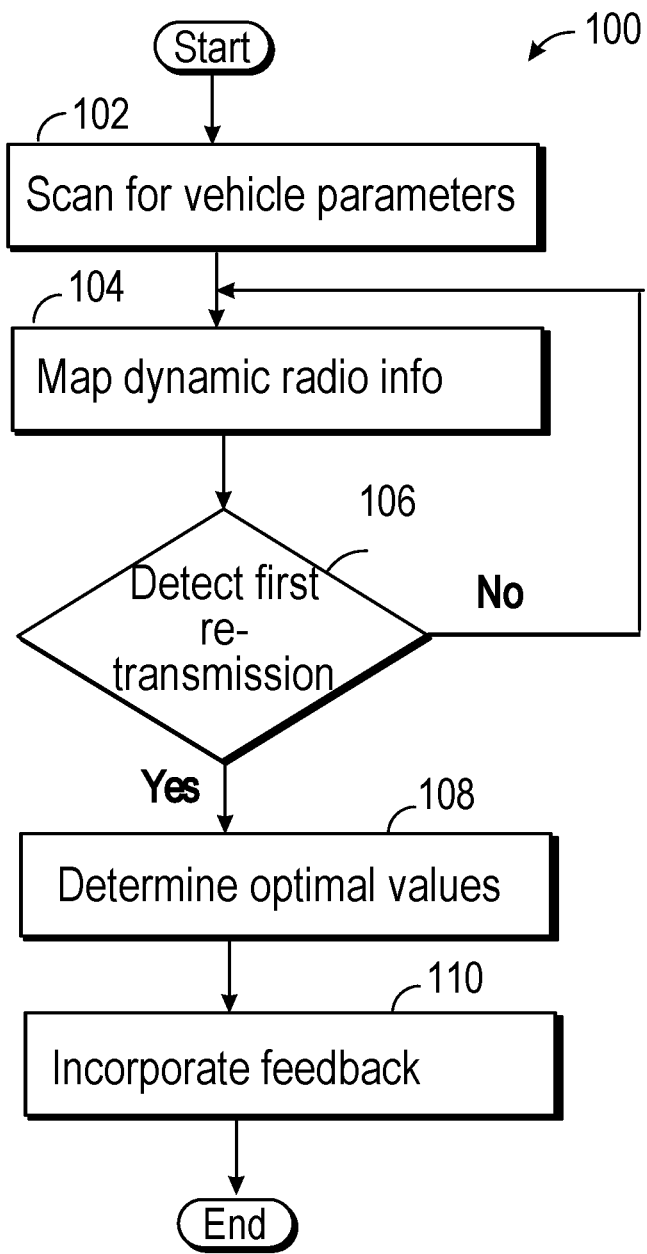
FIG. 3 is a flowchart for a first module executable by the command unit of FIG. 1.

Referring now to FIG. 3, an example flowchart of the Assessment Module 100 is shown, which may be dynamically executed and need not be applied in the specific order recited herein. Furthermore, it is to be understood that some steps may be eliminated. The Assessment Module 100 pertains to a HARQ determination for a downlink session. As understood by those skilled in the art, downlink refers to the transmission path from a base station to the user's equipment, such as the vehicle 12. In 5G, the waveform used for downlink sessions is orthogonal frequency division multiplexing.

Per block 102 of FIG. 3, the command unit 40 is programmed to scan for vehicle situational parameters at the beginning of a data communication cycle. The vehicle situational parameters include at least current location and navigation status of the vehicle 12. The navigation status may include past trajectory, planned route, speed and predicted trajectory. The vehicle situational parameters may include the respective location of one or more cellular towers 46 (see FIG. 1) with a predefined radius of the vehicle 12 and their respective signal strengths.

Proceeding to block 104, the command unit 40 is adapted to map dynamic radio info obtained from vehicular experience data. This may be done periodically or non-periodically. The dynamic radio info may include spectral information, transmission frequency and channel availability information.

Advancing to block 106, the Module 100 includes determining whether a first retransmission (e.g., indicated by line 70 in FIG. 2) has been detected based in part on a data protocol, such as the Transmission Control Protocol. The Transmission Control Protocol (TCP) is a transport protocol that is used on top of the Internet protocol stack to ensure reliable transmission of packets. TCP includes mechanisms to solve many of the problems that arise from packet-based messaging, such as lost packets, out of order packets, duplicate packets, and corrupted packets. Each host that is involved in a communication transaction runs a unique implementation of the protocol stack.

If the first retransmission has been detected (block 106=YES), the Module 100 proceeds to block 108 where the command unit 40 is adapted to determine updated values of the vehicle situational parameters. Additionally, the command unit 40 determines desirable values of elements (such as the retransmission frequency 76 and/or the response time 78) of the request repeating data protocol 60 based on the updated values of the vehicle situational parameters. The desirable values of the request repeating data protocol 60 may be defined as those values that save communication slots, minimize cost of retransmissions, and aid networks in minimizing congestion.

For example, the vehicle 12 may be at a cell edge in a first coverage area with congested or poor cellular coverage, however, the vehicle 12 may be moving towards a second coverage area with better cellular coverage. As noted above, the vehicle situational parameters may include the respective locations of one or more cellular towers 46 (see FIG. 1) with a predefined radius of the vehicle 12 and their respective signal strengths. Based on the vehicle situational parameters here (current location, navigation status etc.), the command unit 40 may increase retransmission frequency 76 (and/or increase the response time 78) until the vehicle 12 arrives at the second coverage area with better cellular coverage. This avoids wastage of slots or channels for HARQ retransmissions.

If the first retransmission has not been detected (block 106=NO), Module 100 loops back to block 104. Advancing from block 108 to block 110, the command unit 40 is adapted to incorporate the feedback in a message transmitted to the base station 32. The message may be part of the physical uplink control channel (PUCCH) that carries uplink control information including channel quality information, acknowledgements, and scheduling requests. The Module 100 is then ended.

Figure 4:
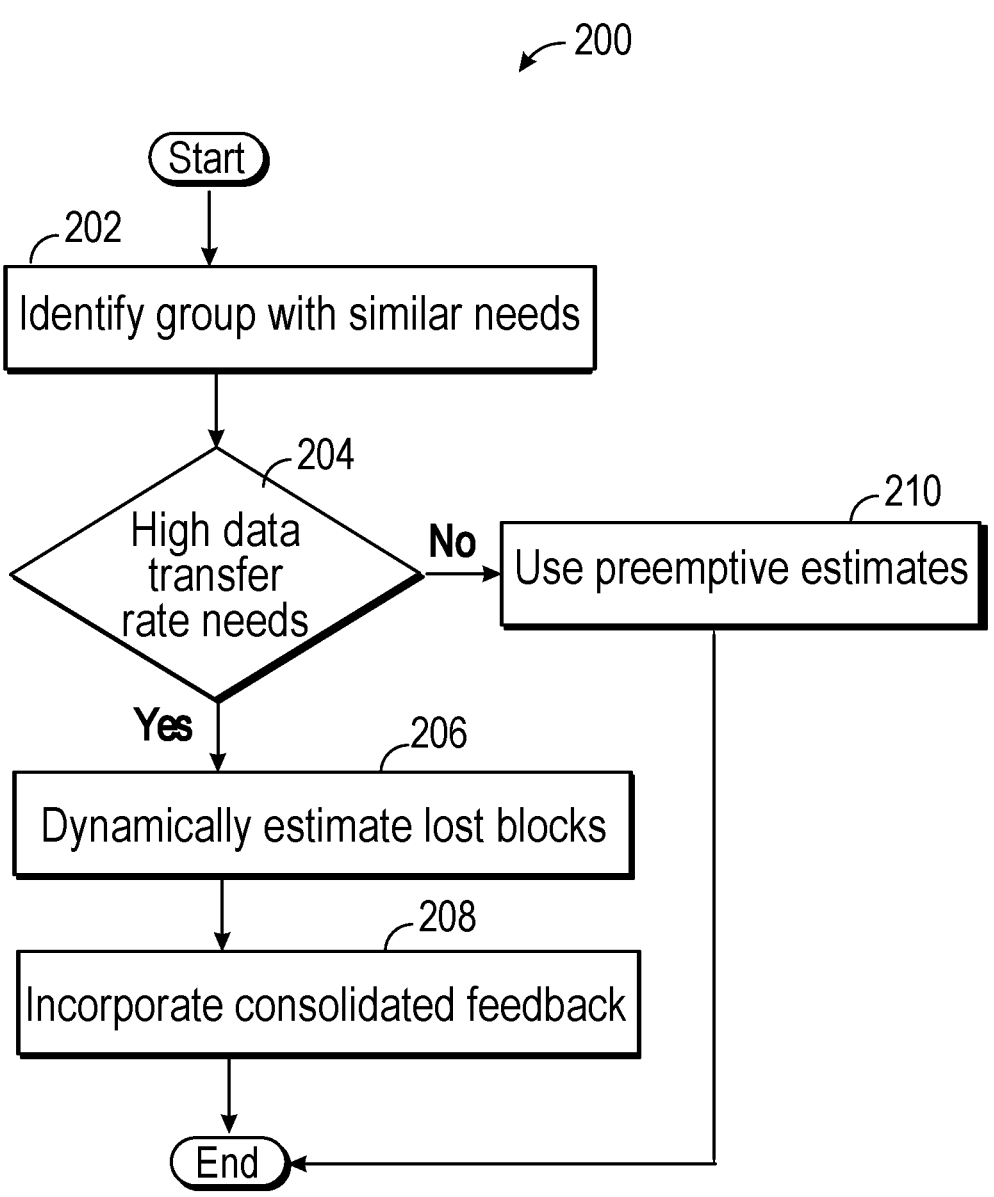
FIG. 4 is a flowchart for a second module executable by the command unit of FIG. 1.

Referring now to FIG. 4, an example flowchart of the First Group Module 200 is shown. The First Group Module 200 allows selective retransmission based on code-block-group (CBG) errors for the group 20. High data rates in 5G result in large transport block sizes. To improve latency and efficiency, 5G networks divide the large transport block into smaller code-blocks and the smaller code-blocks are further grouped into code-block-groups (CBG). The 5G network may indicate acknowledgement and retransmit the data in the unit of code-block-group. The First Group Module 200 decodes the code-block-group numbers with errors from the entire transport group and selectively optimizes the retransmission requests.

The First Group Module 200 may be dynamically executed and need not be applied in the specific order recited herein. Furthermore, it is to be understood that some steps may be eliminated. Per block 202 of FIG. 4, the command unit 40 is adapted to identify a group 20 of vehicles with identical or substantially similar downlink needs, based on predefined criteria. For example, the group 20 may be a platoon that receives similar commands from a central authority. The group 20 may be a transportation fleet that receives similar commands from a head office.

Advancing to block 204, Module 200 includes determining if the average data transfer rate requirements for the group 20 is sufficiently high, i.e., above a predefined high threshold. For example, the command unit 40 is adapted to assess the needs for Enhanced Mobile Broadband (eMBB) applications for the group 20. Enhanced Mobile Broadband is a service category of 5G that defines a minimum level of data transfer rate and enables increased bandwidth and decreased latency.

If the average data transfer rate requirements for the group 20 is above the predefined high threshold (block 204=YES), the Module 200 proceeds to block 206 to dynamically estimate lost blocks. A lead vehicle 22 in the group 20 is selected to consolidate and dynamically estimate the lost code-block-groups amongst the group 20.

Proceeding to block 208, the command unit 40 is adapted to incorporate consolidated feedback to the base station 32. Generally, the user equipment (vehicle 12) decodes the code-block-groups and send HARQ feedback (ACK/NACK) for each of the individual groups. Here, the lead vehicle 22 incorporates the number of HARQ retransmissions and sends the consolidated feedback (applying to the group 20). For example, a lead vehicle or alpha vehicle in the group 20 may search for code-block-group errors in a grouped fashion and selectively send out acknowledgement signals.

If the average data transfer rate is not sufficiently high (block 204=NO), the Module 200 proceeds to block 210 to use preemptive estimates for the code-block-group retransmission, e.g., by estimating the highest probability of loss. Module 200 allows the Ultra-Reliable Low Latency Communication (URLLC) application to have pre-emptive code-block-group retransmission estimates based on vehicle motion or stationary criteria. Module 200 ends after block 208 and block 210.

Figure 5:
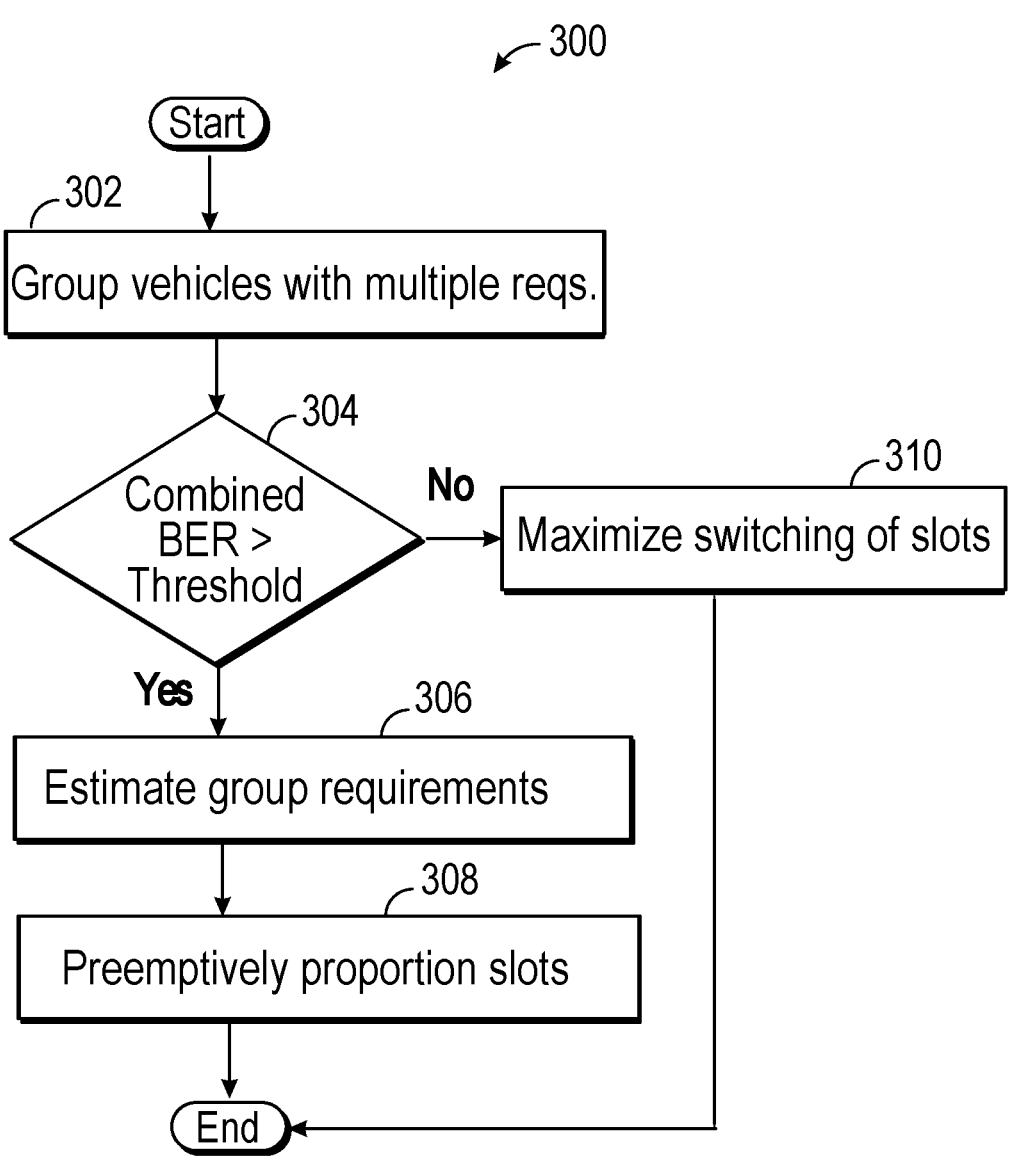
FIG. 5 is a flowchart for a third module executable by the command unit of FIG. 1.

Referring now to FIG. 5, an example flowchart of the Second Group Module 300 is shown, which may be dynamically executed and need not be applied in the specific order recited herein. Furthermore, it is to be understood that some steps may be eliminated.

Per block 302 of FIG. 5, the command unit 40 is programmed to identify a group 20 of vehicles with both high data transfer needs (e.g., requirement for Enhanced Mobile Broadband applications) and low latency needs (e.g., requirement for Ultra-Reliable Low Latency Communication applications). The Ultra-Reliable Low Latency Communication (URLLC) and Enhanced Mobile Broadband, along with massive Machine Type Communication (mMTC) are examples of major services that many networks (such as 5G) provide.

Advancing to block 304, the command unit 40 is adapted to determine if a combined or average bit error rate (averaged over the group 20) is greater than a predefined error rate threshold. The predefined error rate threshold may be based on a guaranteed flow bit rate (GBR). The bit error rate reflects the number of errors appearing in the data that appears at the remote end. The bit error rate characterizes the performance of data channels when transmitting data from one point to another over a radio/wireless link.

If the average bit error rate is greater than the predefined error rate threshold (block 304=YES), Module 300 advances to block 306 where the command unit 40 estimates the vehicle condition and needs metrics for the group as a whole for both the Enhanced Mobile Broadband applications and the URLLC applications. This allows pre-emptive proportioning of URLLC slots based on previous HARQ feedback as a group. A slot may refer to HARQ channels utilized for transmission by a sender 62, with URLLC slots being reserved for URLLC applications.

Proceeding to block 308 from block 306, the command unit 40 is adapted to preemptively proportion the URLLC slots based on previous HARQ feedback as a group. In other words, respective slots for the URLLC applications are reserved based on previous values of the retransmission frequency 76 and the response time 78 for the group. The amount of preemptive overwrites for the URLLC slots may be varied based on retransmission ratio for the Enhanced Mobile Broadband slots in the data exchange.

If the average bit error rate is less than or equal to the predefined error rate threshold (block 304=NO), Module 300 advances to block 310 where the command unit 40 maximizes the switching of respective slots from Enhanced Mobile Broadband applications to URLLC applications, based on lower HARQ retransmission rates. Module 300 ends after block 310 and block 308.

Figure 6:
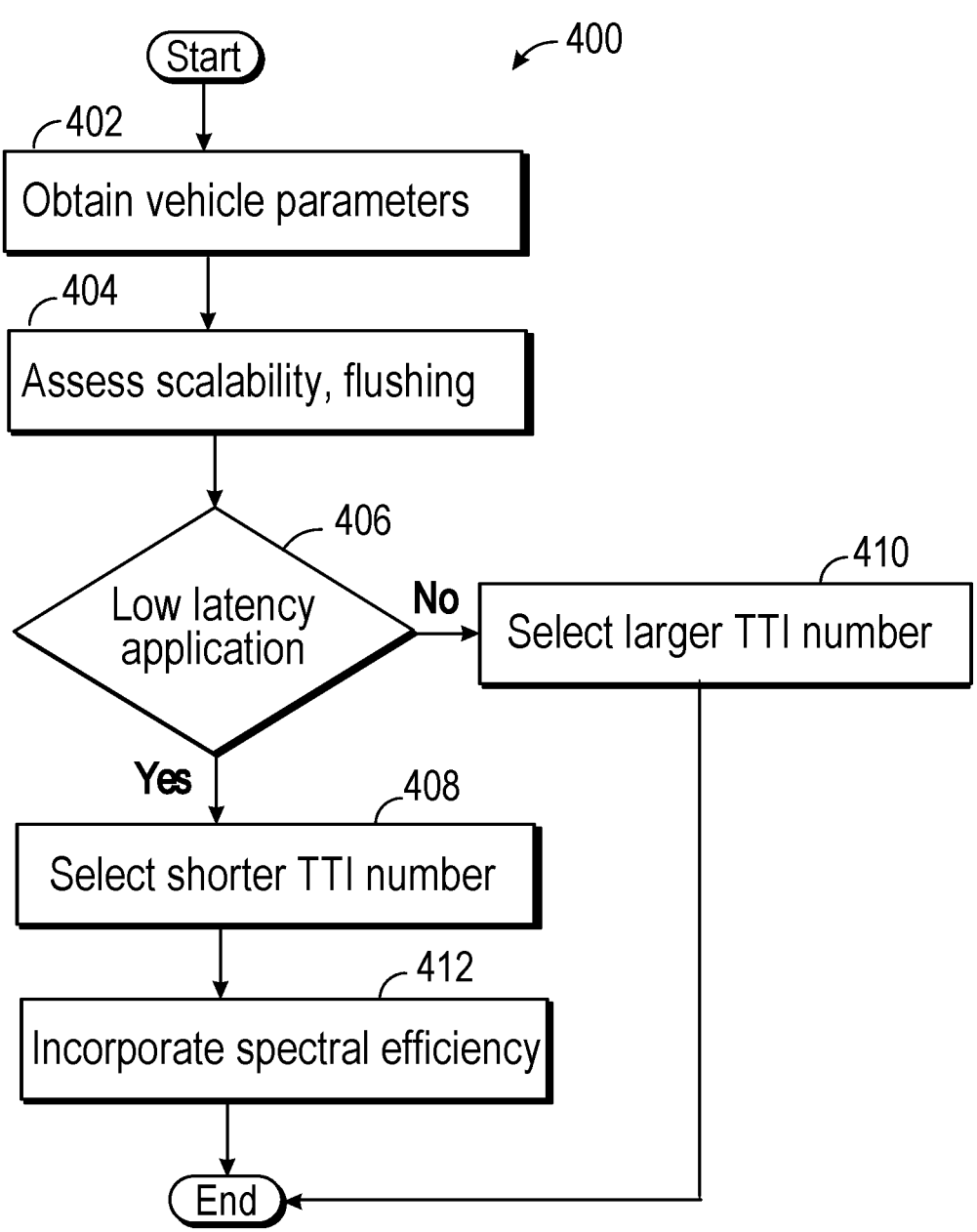
FIG. 6 is a flowchart for a fourth module executable by the command unit of FIG. 1.

Referring now to FIG. 6, an example flowchart of the transmission time interval (TTI) Bundling Module 400 is shown, which may be dynamically executed and need not be applied in the specific order recited herein. Furthermore, it is to be understood that some steps may be eliminated.

The TTI Bundling Module 400 applies to an uplink session for the vehicle 12 and improves uplink coverage at a cell edge. In each transmission time interval, one or more transport blocks of dynamic size may be delivered to the physical layer and transmitted over a radio interface. To combat errors, data is divided at the sender into blocks and the bits within a block are encoded and interleaved In a TTI Bundling protocol, the sender 62 may transmit data in a physical uplink shared channel (PUSCH) with different redundancy versions in multiple consecutive sub-frames and receive a single acknowledgement signal (ACK/NACK) for the entire bundle. The number of transport blocks transmitted within a TTI depends on the configuration and may be referred to as the TTI number.

Per block 402 of FIG. 5, the command unit 40 is programmed to obtain vehicle situational parameters, including at least current location and navigation status of the vehicle 12. Advancing to block 404, the command unit 40 is adapted to determine the TTI number and the scalability of the TTI number for each sub frame based on the vehicle position, motion condition, radio knowledge etc. Scalable TTI (as opposed to fixed TTI) is where the TTI duration (and channel assignments) may be adapted to the deadlines and requirements of different services. The HARQ buffer flushing is determined by vehicle situational parameters such as position, route, trajectory and radio knowledge.

Advancing to block 406, the command unit 40 is adapted to determine if the uplink session is a low-latency application, with the latency being below a predefined latency threshold. If so (block 406=YES), Module 400 advances to block 408 where the command unit 40 selects the TTI number to be relatively small. If not (block 406=NO), Module 400 advances to block 410 where the command unit 40 selects the TTI number to be relatively large. Proceeding to block 412, the TTI number may be adjusted based on spectral efficiency related vehicular applications. Module 400 is ended.

In summary, the system 10 optimizes communications for motor vehicles and various other devices (e.g., smartphones, other mobile devices, servers, and/or an electronic computing device) that use a stop-and-wait protocol. The system 10 provides a multi-prong approach for both individual and groups of vehicles, saving communication slots, cost of retransmissions, and aiding networks in minimizing congestion.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The command unit 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of managing communications in a vehicle, the system comprising:

a command unit having a processor and tangible, non-transitory memory on which instructions are recorded, the command unit being adapted to:

select an uplink session for the vehicle for execution of a transmission time interval (TTI) bundling protocol defined by a TTI number, the TTI bundling protocol being adapted to permit data transfer in multiple consecutive sub-frames with a single acknowledgement signal for an entire bundle;

determine if the uplink session is a low-latency application having a latency below a predefined latency threshold;

select the TTI number to be relatively small when the latency is below the predefined latency threshold and select the TTI number to be relatively large when the latency is at or above the predefined latency threshold;

execute a retransmission request protocol upon receipt of erroneous data;

determine vehicle situational parameters at a beginning of a data communication cycle, the vehicle situational parameters including current location and navigation status of the vehicle;

when a first retransmission according to the retransmission request protocol is detected, determine updated values of the vehicle situational parameters;

determine a desirable value for a retransmission frequency for the retransmission request protocol based in part on the updated values;

determine if an average bit error rate for a group is greater than a predefined error rate threshold, the group having requirements for Enhanced Mobile Broadband applications and Ultra-Reliable Low Latency Communication (URLLC) applications, the vehicle being part of the group;

estimate the requirements for the Enhanced Mobile Broadband applications and the Ultra-Reliable Low Latency Communication (URLLC) applications for the group when the average bit error rate is greater than the predefined error rate threshold; and reserve respective slots for the URLLC applications based on previous values of the retransmission frequency and a response time for the group.

2. The system of claim 1, wherein the retransmission request protocol is Hybrid Automatic Repeat Request (HARQ).

3. The system of claim 1, wherein the command unit is adapted to determine the desirable value for a response time based in part on the vehicle situational parameters, the response time being between receipt of the erroneous data and a response by the telematics unit.

4. The system of claim 1, wherein the vehicle situational parameters include respective locations and respective signal strengths of one or more cellular towers within a predefined radius of the vehicle.

5. The system of claim 1, wherein:

the command unit is adapted to determine if an average data transfer rate required by a group of vehicles is above a predefined high threshold, the group having substantially similar downlink needs; and wherein the vehicle is part of the group.

6. The system of claim 5, wherein the command unit is adapted to:

designate a lead vehicle in the group to estimate lost code-block-groups (CBGs) for the group when the average data transfer rate for the group is above the predefined high threshold, employ preemptive estimates for the retransmission frequency for the lost code-block-groups (CBGs) when the average data transfer rate for the group is below the predefined high threshold.

7. The system of claim 1, wherein the command unit is adapted to:

maximize switching of the respective slots from the Enhanced Mobile Broadband applications to the URLLC applications when the average bit error rate is less than or equal to the predefined error rate threshold.

8. A method of managing communications in a vehicle having a command unit having a processor and tangible, non-transitory memory on which instructions are recorded, the method comprising:

selecting an uplink session for the vehicle for execution of a transmission time interval (TTI) bundling protocol defined by a TTI number, via the command unit, the TTI bundling protocol being adapted to permit data transfer in multiple consecutive sub-frames with a single acknowledgement signal for an entire bundle;

determining if the uplink session is a low-latency application having a latency below a predefined latency threshold, via the command unit;

selecting the TTI number to be relatively small when the latency is below the predefined latency threshold, via the command unit and selecting the TTI number to be relatively large when the latency is at or above the predefined latency threshold, via the command unit;

executing a retransmission request protocol upon receipt of erroneous data, via the command unit;

determining vehicle situational parameters at a beginning of a data communication cycle, via the command unit, the vehicle situational parameters including current location and navigation status of the vehicle;

determining updated values of the vehicle situational parameters when a first retransmission according to the retransmission request protocol is detected, via the command unit;

determining a desirable value of a retransmission frequency for the retransmission request protocol based in part on the updated values, via the command unit;

determining if an average bit error rate for a group is greater than a predefined error rate threshold, the vehicle being part of the group, the group having requirements for both Enhanced Mobile Broadband applications and Ultra-Reliable Low Latency Communication (URLLC) applications, via the command unit;

estimating the requirements for the Enhanced Mobile Broadband applications and the Ultra-Reliable Low Latency Communication (URLLC) applications for the group when the average bit error rate is greater than the predefined error rate threshold, via the command unit;

reserving respective slots for the URLLC applications based on previous values of the retransmission frequency and a response time for the group, via the command unit; and maximizing switching of the respective slots from the Enhanced Mobile Broadband applications to the URLLC applications when the average bit error rate is less than or equal to the predefined error rate threshold, via the command unit.

9. The method of claim 8, further comprising:

selecting the retransmission request protocol to be Hybrid Automatic Repeat Request (HARQ), via the command unit; and determining the desirable value for a response time based in part on the vehicle situational parameters, via the command unit, the response time being between receipt of the erroneous data and a response by the telematics unit.

10. The method of claim 8, further comprising:

determining if an average data transfer rate required by a group of vehicles is above a predefined high threshold, via the command unit, the group having substantially similar downlink needs, the vehicle being part of the group. 5

11. The method of claim 10, further comprising:

designating a lead vehicle in the group to estimate lost code-block-groups for the group when the data transfer rate requirement for the group is above the predefined high threshold, via the command unit; and 10 employing preemptive estimates for the retransmission frequency of the lost code-block-groups when the data transfer rate requirement for the group is below the predefined high threshold, via the command unit. 15

* * * * *